US010590911B2

(12) United States Patent
Aull et al.

(10) Patent No.: US 10,590,911 B2
(45) Date of Patent: Mar. 17, 2020

(54) HYBRID ROLLING BRIDLE SYSTEM FOR DISTRIBUTING LOAD WHILE PERMITTING FREEDOM OF ROTATION

(71) Applicant: Windlift LLC, Durham, NC (US)

(72) Inventors: Mark Aull, Carrboro, NC (US); Andrew Stough, Cary, NC (US)

(73) Assignee: WINDLIFT LLC, Durham, NC (US)

( * ) Notice: Subject to any disclaimer, the term of this patent is extended or adjusted under 35 U.S.C. 154(b) by 0 days.

(21) Appl. No.: 16/340,631

(22) PCT Filed: Oct. 31, 2017

(86) PCT No.: PCT/US2017/055955
§ 371 (c)(1),
(2) Date: Apr. 9, 2019

(87) PCT Pub. No.: WO2018/075296
PCT Pub. Date: Apr. 26, 2018

(65) Prior Publication Data
US 2019/0338751 A1 Nov. 7, 2019

Related U.S. Application Data

(60) Provisional application No. 62/406,300, filed on Oct. 10, 2016.

(51) Int. Cl.
*F03D 5/00* (2006.01)
*B64C 31/06* (2020.01)

(52) U.S. Cl.
CPC ............... *F03D 5/00* (2013.01); *B64C 31/06* (2013.01); *F05B 2240/917* (2013.01); *F05B 2240/921* (2013.01)

(58) Field of Classification Search
CPC ..... F03D 5/00; F03D 5/02; F03D 5/04; B64C 31/06; B64C 39/022; B64C 2201/148; A63H 27/002; B96B 35/7979; B63B 35/7979
See application file for complete search history.

(56) References Cited

U.S. PATENT DOCUMENTS

| 7,582,981 | B1 | 9/2009 | Meller |
| 7,656,053 | B2 | 2/2010 | Griffith et al. |
| 7,847,426 | B1 | 12/2010 | Griffith et al. |
| 8,421,257 | B2 | 4/2013 | Chernyshov |
| 9,056,677 | B1 | 6/2015 | Jensen et al. |
| 9,156,565 | B2 | 10/2015 | Hachtmann |

(Continued)

FOREIGN PATENT DOCUMENTS

WO  WO-2019070735 A2  4/2019

*Primary Examiner* — Nicholas McFall
(74) *Attorney, Agent, or Firm* — Dunham IP Law LLC

(57) ABSTRACT

The exemplary embodiments herein provide a bridle for use with a rigid wing having two opposing ends, the bridle having a fixed bridle member attached to a bottom surface of the wing, a pair of connection points positioned on the fixed bridle and located at distance D vertically below the bottom surface of the wing, a rolling bridle member with a pair of opposing ends, where each opposing end is attached at one of the connection points, and a pulley with a sheave that travels along the rolling bridle member. In some embodiments, a motor is mechanically connected with the sheave. In some embodiments, the distance D is optimized for a preferred roll moment as the wing rolls through various angles.

20 Claims, 4 Drawing Sheets

(56) References Cited

U.S. PATENT DOCUMENTS

| | | |
|---|---|---|
| 9,212,033 B2 | 12/2015 | Vander Lind et al. |
| 9,239,041 B2 | 1/2016 | Goldstein |
| 9,248,910 B1 | 2/2016 | Devaul et al. |
| 9,308,975 B2 | 4/2016 | Vander Lind |
| 9,327,845 B2 | 5/2016 | Vander Lind |
| 9,329,096 B1 | 5/2016 | Jensen et al. |
| 9,352,832 B2 | 5/2016 | Vander Lind |
| 9,458,829 B2 | 10/2016 | Hallamasek |
| 9,664,175 B2 | 5/2017 | Vander Lind et al. |
| 9,705,302 B1 | 7/2017 | Patten |
| 9,709,026 B2 | 7/2017 | Vander Lind |
| 9,732,731 B2 | 8/2017 | Hachtmann et al. |
| 9,764,820 B2 | 9/2017 | Kinne et al. |
| 9,771,925 B2 | 9/2017 | GilroySmith et al. |
| 9,784,243 B2 | 10/2017 | Vander Lind et al. |
| 9,835,139 B2 | 12/2017 | Vander Lind |
| 9,884,692 B2 | 2/2018 | Patten et al. |
| 10,280,034 B2 | 5/2019 | Belani et al. |
| 10,301,143 B2 | 5/2019 | Belani et al. |
| 10,310,516 B2 | 6/2019 | Nordstrom et al. |
| 10,442,524 B1 | 10/2019 | Treat et al. |
| 2009/0072092 A1 | 3/2009 | Griffith et al. |
| 2010/0032948 A1 | 2/2010 | Bevirt |
| 2010/0032949 A1 | 2/2010 | Varrichio et al. |
| 2010/0213718 A1 | 8/2010 | Kelly |
| 2010/0295303 A1 | 11/2010 | Vander Lind et al. |
| 2011/0121570 A1 | 5/2011 | Bevirt et al. |
| 2011/0260462 A1 | 10/2011 | Vander Lind |
| 2012/0104763 A1 | 5/2012 | Lind |
| 2013/0221679 A1 | 8/2013 | Vander Lind |
| 2015/0225080 A1 | 8/2015 | Bormann et al. |
| 2015/0251763 A1 | 9/2015 | Vander Lind |
| 2015/0308410 A1 | 10/2015 | Goldstein |
| 2015/0330368 A1 | 11/2015 | Goldstein |
| 2016/0002013 A1 | 1/2016 | Hachtmann et al. |
| 2017/0121036 A1 | 5/2017 | Hachtmann et al. |
| 2017/0190418 A1 | 7/2017 | Patten et al. |
| 2018/0094619 A1 | 4/2018 | Sellers et al. |
| 2018/0170491 A1 | 6/2018 | Nordstrom et al. |
| 2018/0170537 A1 | 6/2018 | Hachtmann et al. |
| 2019/0031340 A1 | 1/2019 | Patten et al. |
| 2019/0177006 A1 | 6/2019 | Quick et al. |

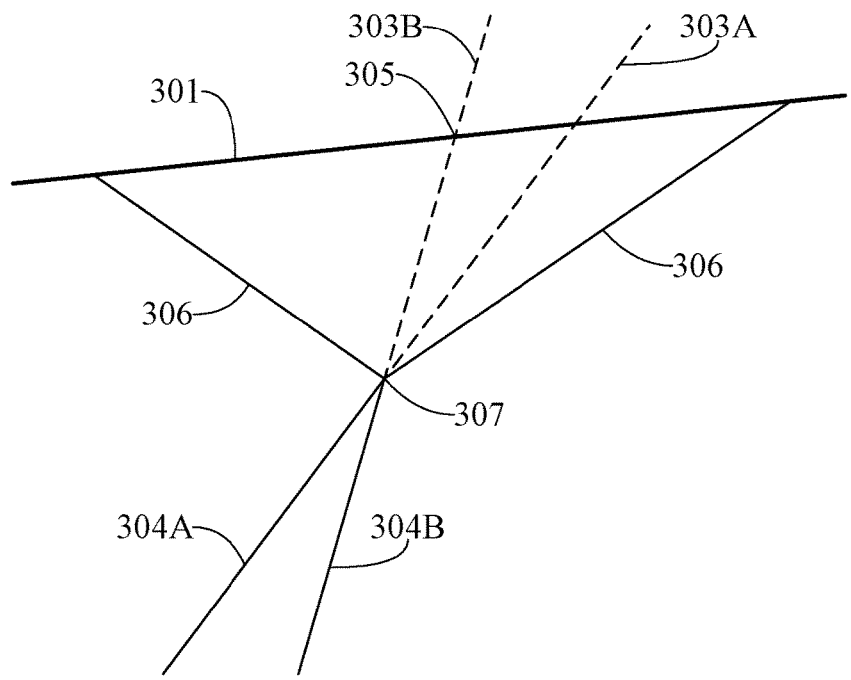
Fig. 3 FIXED BRIDLE
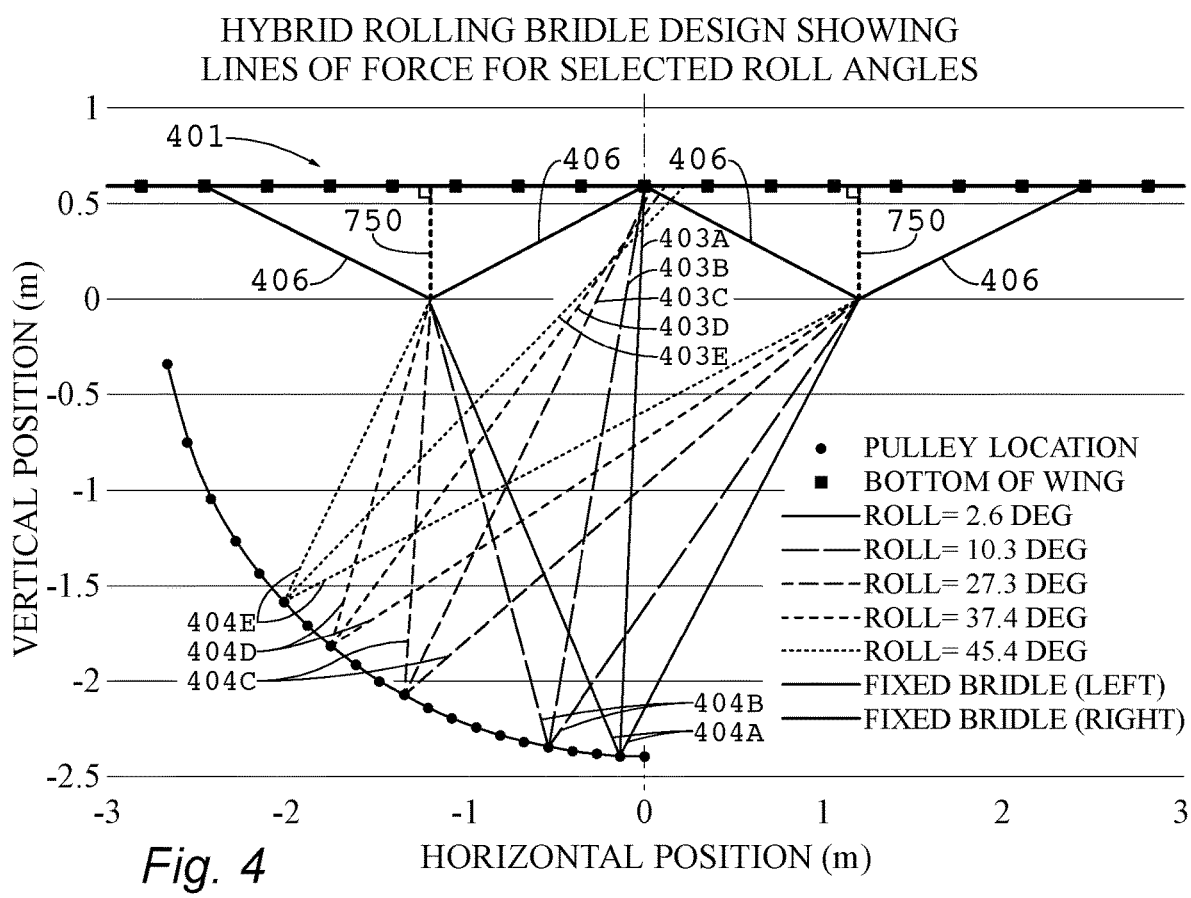
Fig. 4

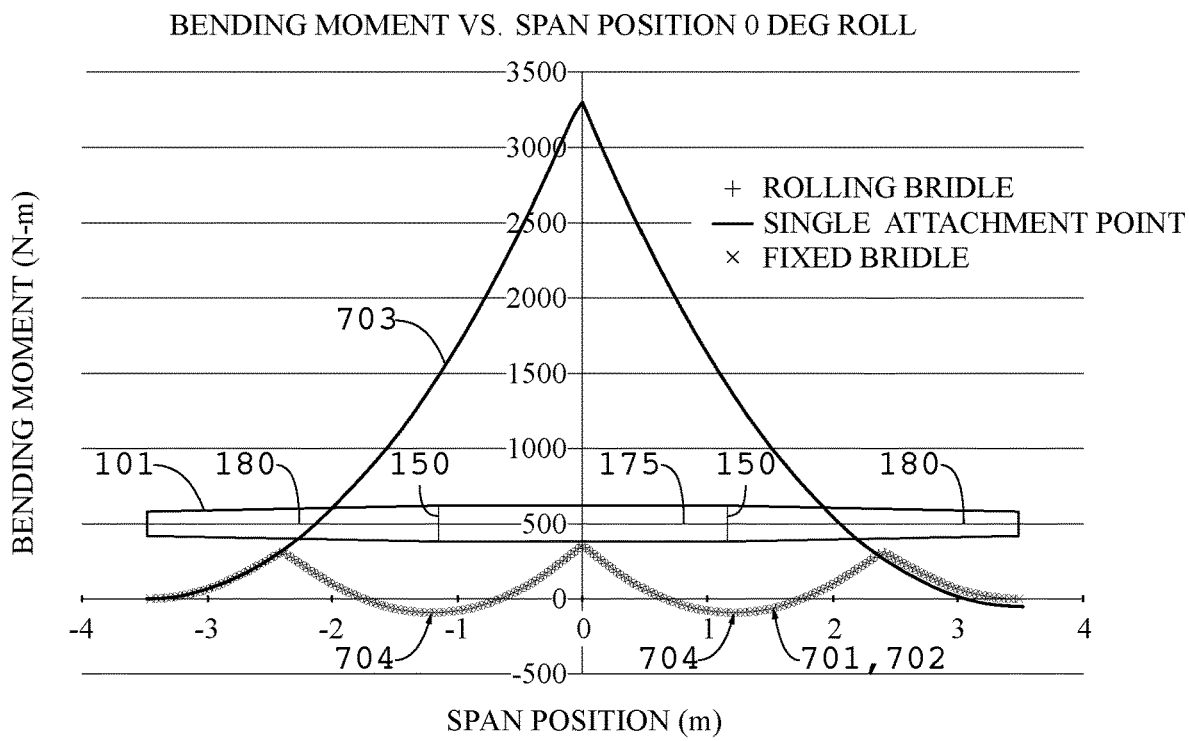
Fig. 7
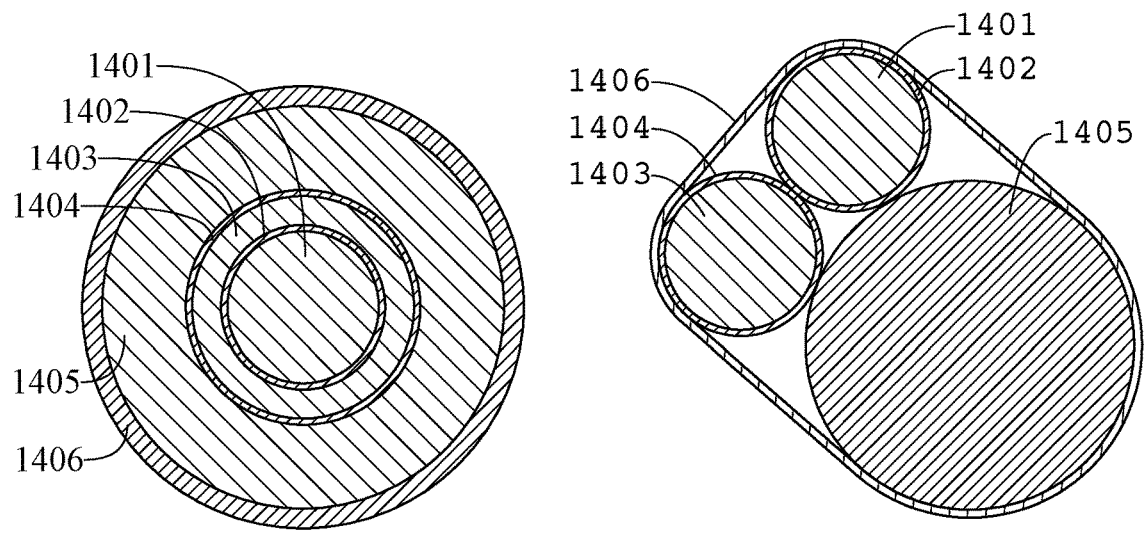
Fig. 8A
Fig. 8B

HYBRID ROLLING BRIDLE SYSTEM FOR DISTRIBUTING LOAD WHILE PERMITTING FREEDOM OF ROTATION

CROSS-REFERENCE TO RELATED APPLICATIONS

This application claims priority to and is a National Stage Filing of PCT Application PCT/US2017/55955 filed on Oct. 10, 2017 which claims priority to U.S. Provisional Application No. 62/406,300 filed on Oct. 10, 2016, both of which are herein incorporated by reference in their entirety.

TECHNICAL FIELD

Embodiments generally relate to airborne tethered vehicles.

BACKGROUND OF THE ART

Airborne Wind Energy involves harvesting wind energy to produce electricity, many embodiments of which use kite/wing designs. The generation of electricity using kites/wings is strongly dependent on the trajectory of the flight vehicle. When the airfoil is in a power generation cycle, the roll angle relative to the tether varies continuously throughout the cycle and with changing wind conditions. This rolling orients the lift force of the kite/wing to balance other forces on the vehicle and generate required centripetal accelerations for turning.

Rigid winged vehicles (wing) are generally more desirable for Airborne Wind Energy because they are more aerodynamically efficient than soft wing kites.

SUMMARY OF THE EXEMPLARY EMBODIMENTS

Exemplary embodiments involve a tethered airborne vehicle (wing) where the tether load is significant relative to other structural loads and control forces.

The exemplary embodiments of the hybrid rolling bridle configuration preferably uses one pulley affixed to a line which attaches to further bridling and then to a tethered wing. The present invention is a new bridling design which retains the structural advantages of a bridle without the requirement for large external control moments of a fixed bridle and without the instability of a pure pulley-based bridle. The present invention may also allow the user to modify the roll stability characteristics of the wing which may be advantageous for control purposes.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 3 is an illustration of a fixed bridle configuration showing the tether at two different roll angles, 304A and 304B, as well as the lines of action of the forces due to the tether tension in those positions 303B and 303A.

FIG. 4 is a graph showing the elliptical path 402 traced out by the pulley as the roll angle changes for an exemplary rolling bridle system, along with the bridle lines 404A-E and 406 and line of force 403A-E for selected roll angles.

FIG. 7 is a graph of the bending moment across a symmetrically loaded wing supported by a fixed bridle 701, a single attachment point 703 and a hybrid rolling bridle 702.

FIG. 8A is a section view showing a cross-section taken through a plane that is perpendicular to the central axis of one exemplary embodiment of the tether 102.

FIG. 8B is a section view showing a cross-section taken through a plane that is perpendicular to the central axis of another exemplary embodiment of the tether 102.

DETAILED DESCRIPTION

Figure 1:
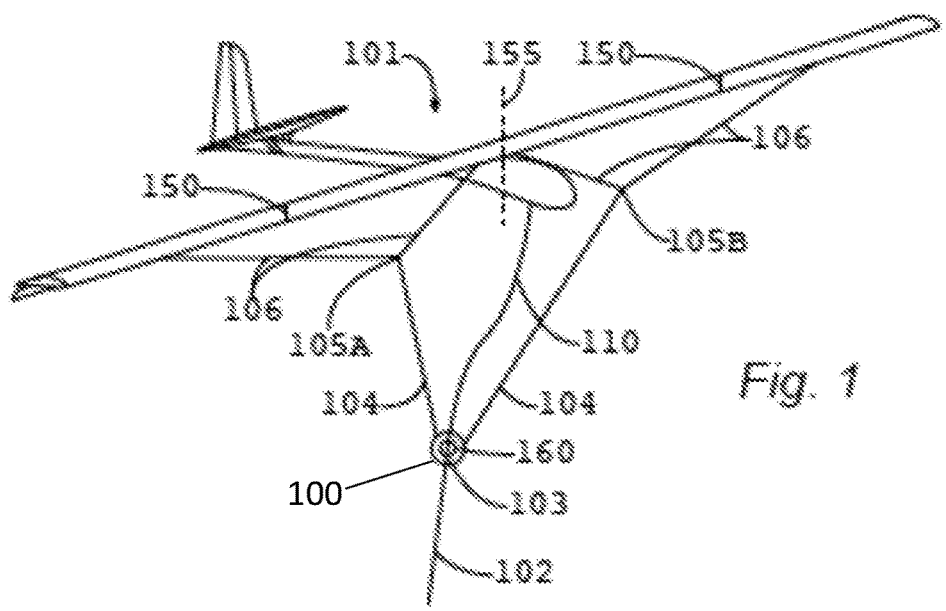
FIG. 1 is a perspective view of an exemplary embodiment of the hybrid bridle and tether combination with a wing in flight.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Tethered rigid wings may utilize different bridling designs. A rigid wing vehicle may use a fixed bridle, which distributes the force applied by the tether across the wing, reducing stress, shear, and bending moment, thereby allowing a lighter airframe to be designed. However, such a bridle system creates a restoring roll moment proportional to the distance from the wing to the point where the tether attaches to the bridle. Therefore large external control moments are required to change the roll angle relative to the tether, which limits the ability to control the wing by limiting the maximum achievable roll angle. These control moments may be generated, for example, by ailerons or a motor-driven pulley attached to the bridle. A tethered rigid wing may alternatively use a single attachment point without a bridle, which allows the vehicle to roll more freely but requires more structure to support the wings.

It should be noted that the term "wing" will be used herein to represent any rigid wing aircraft or airfoil that may or may not generate power. While some soft wing kites could be used in some embodiments, a preferred embodiment would use a wing in combination with the exemplary bridle system. An exemplary embodiment of the hybrid rolling bridle configuration may use one pulley affixed to a line which attaches to further bridling and then to a tethered wing to distribute the load while providing improved control of a roll angle during flight.

FIG. 1 is a perspective view of an exemplary embodiment of the hybrid bridle and tether 102 combination with a wing 101 in flight. The wing 101 is generally connected to the ground via a tether 102. Tether 102 may contain one or more electrically conductive elements or may be a strength member only. The tether may connect to the bridle system through a pulley 103 where the conductive elements 110 of the tether (along with other elements such as insulation, an optional strength member, or a protective jacket) may then be routed to the fuselage of the wing 101.

A rolling bridle line 104 preferably runs over the sheave 100 of the pulley 103, having two opposing ends which each connect with the two fixed bridle attachment points at 105A and 105B. Each of the fixed bridle lines 106 are preferably attached to the wing 101 along the bottom surface of the wing 101 and near the centerline 155. The term 'near' the centerline 155 is used herein to represent the fact that in many embodiments, the bridle lines 106 may not be attached directly on the centerline 155 but may simply be on the central wing portion and near the center of the wing 101. In some embodiments, the pulley 103 is a motor 160 driven pulley and is fixed to the rolling bridle line 104 in order to directly control the roll angle of wing 101. In these embodiments, as the rolling bridle 104 is engaged with the sheave of the pulley, which is mechanically engaged with the motor 160, the rotation of the motor causes rotation of the sheave which causes the rolling bridle 104 to travel through the pulley 103, thus adjusting the roll angle of the wing 101 (see FIG. 4 as an illustration). The bridles 106 may be flexible members such as wire rope or cable, or could be rigid members.

The attachment points 105A and 105B may be placed at the midpoint of fixed bridle members 106 in order to bisect the members 106 into two equal lengths each. Alternatively, as shown in FIG. 1, attachment points 105A and 105B may be positioned so that element 106 is not divided into two equal segments. Preferably, the rolling bridle 104 does not slide relative to the fixed bridle members 106 at the attachment points 105A and 105B. As shown, the fixed bridle members 106 can also be described as each having a proximal end which is attached to the bottom surface of the wing 101 near the centerline 150 and a distal end that is attached to the bottom surface of the wing 101 and away from the centerline, at least halfway down the length of the wing. Preferably, the distal end of the fixed bridle member 106 is not attached at the end of the wing 101, but would only be placed between 50% and 90% of the length of the wing 101. In other words, if the overall wing span is 7 m for example, the distal end of the fixed bridle member 106 should be placed between 50% and 90% of 3.5 m, which would be approximately 1.75 m and 3.15 m away from the centerline 150 of the wing 101. FIG. 4 provides an example of one preferred placement of the bridles 106 (in that FIG. 406) when using a wingspan of approximately 7 m.

Figure 2A:
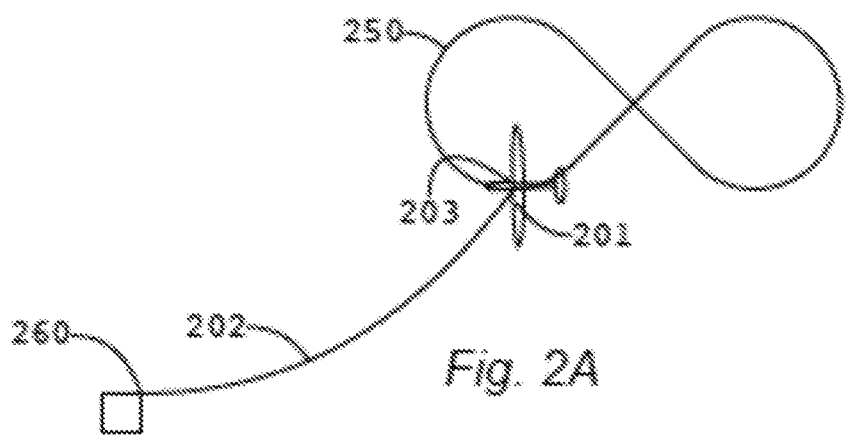
FIG. 2A is an illustration of a wing 201 with a single attachment point 203, also showing the air vehicle's trajectory 202.

FIG. 2A is an illustration of a tethered wing 201 with a single attachment point 203, also showing the wing's trajectory 250. The trajectory 250 is generally a FIG. 8 pattern, which the wing is able to fly because it can freely roll to a wide range of angles. However, the wing must be strong enough to support the large bending moment, adding structural weight, which is undesirable and sometimes impossible in AWE applications. The tether 202 is preferably attached to the ground or sea bed at ground attachment point 260. It should be stated that this trajectory 250 is also the trajectory that would preferably be flown by wings 101 which utilize the exemplary bridle systems as shown in FIG. 1. The figures herein illustrate the roll angles that would be required for the wing 101 to fly the FIG. 8 path.

Figure 2B:
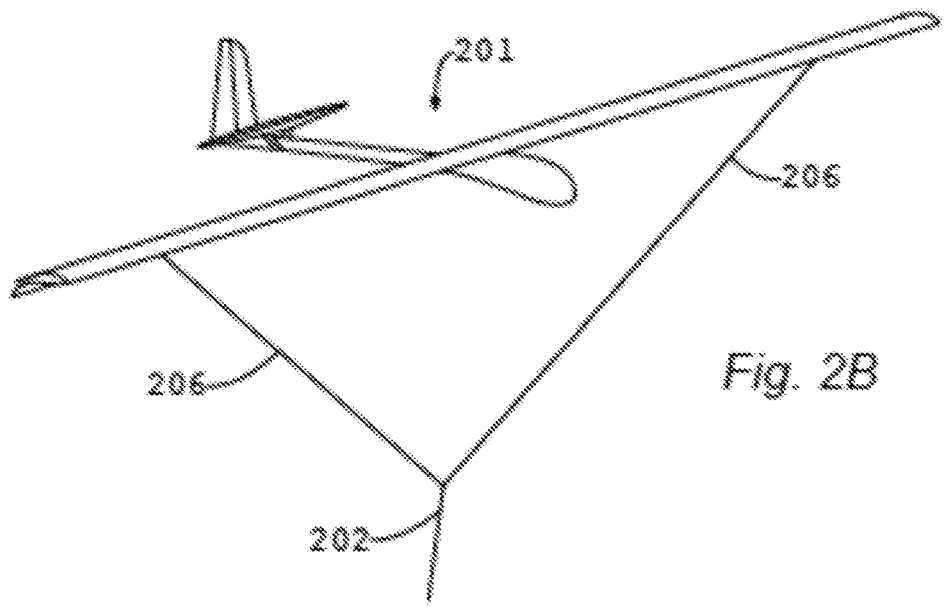
FIG. 2b is a perspective view of wing 201 with a fixed bridle.

FIG. 2B is a perspective view of a wing 201 with a fixed bridle. The wing 201 is attached to tether 204 via fixed bridle 206. It requires less structure and therefore has reduced weight relative to an unbridled wing, but at the cost of reduced roll control. Such a vehicle would have to fly in a circular pattern, which has at least three disadvantages relative to a FIG. 8 cycle. First, the tether twists during flight, requiring complex mechanisms to unwind the tether and to maintain a conductive path for electromechanical tethers. Second, in a circular flight trajectory the wing travels directly toward the ground during the power generating cycle, leading to a small margin of error during flight maneuvers. A wing flying a FIG. 8 pattern utilizing "up-loops" never travels directly towards the ground, which improves the margin of error. Third, the circular power generation cycle may be not be optimized relative to a FIG. 8 pattern.

FIG. 3 is an illustration of a fixed bridle configuration showing the tether at two different roll angles, 304A and 304B, as well as the lines of action of the forces due to the tether tension in those positions 303B and 303A. The bottom side of the wing 301 is connected to at least two fixed bridle lines 306. These lines are connected to the tether at a single pivot point 307. When at the nominal roll angle, the tether is at 304B and the line of force 303B goes through the center of mass 305 of the wing, yielding a minimal reaction moment due to a minimal moment arm from the center of the wing. Alternatively, for the tether 304A at an arbitrary roll angle, the line of force 303A is offset from the wing center, causing a significant restoring moment transferred from the tether to the wing, requiring a large control moment.

FIG. 4 is a graph of the exemplary rolling bridle system which shows the lines of action of the tether forces. The bottom of the wing is shown at 401 and the fixed bridle lines are 406. In this embodiment, the lengths of 406 are each substantially the same, although not required for each embodiment of the invention. The elliptical path traced out by the pulley 103 as the roll angle changes is 402. The rolling bridle lines 404 and lines of force 403 are shown for angles 2.6, 10.3, 27.3, 37.4, and 45.4 degrees 403 A-E and 404 A-E respectively. For this configuration, the lines of action for a wide range of roll angles converge relatively close to the center of the vehicle, thus minimizing the roll moment due to the bridle and minimizing control moment required.

For a system with ailerons and a free pulley, the tether tension line of action 403 bisects the bridle lines 404 coming from the pulley (because the tension in those lines is the same), and ailerons move the center of lift. The system will reach a steady state when the tether tension line 403 of action goes through the center of lift. Therefore a bridle configuration where the lines of action due to tension converge near the center of the wing requires less aileron control. For a system without ailerons using a motor-driven pulley, the line of action due to tether tension 403 always passes through the center of the vehicle because the center of lift is generally at the center of the vehicle, and the motor torque creates a tension difference in the lines 404 running over the pulley. This difference moves the tension line of action away from the line bisecting those bridle lines. Therefore a bridle configuration with converging lines of action similarly minimizes the torque required for a motor to produce roll.

FIG. 4 also provides the vertical fixed bridle height 750 which is defined as the vertical distance between the bottom surface of the wing 401 and the attachment points 105A and 105B on the bridles 106/406. This vertical fixed bridle height 750 has been discovered to be an important variable for optimization in minimizing the rolling moment during roll of the wing. This is discussed further below.

Figure 5:
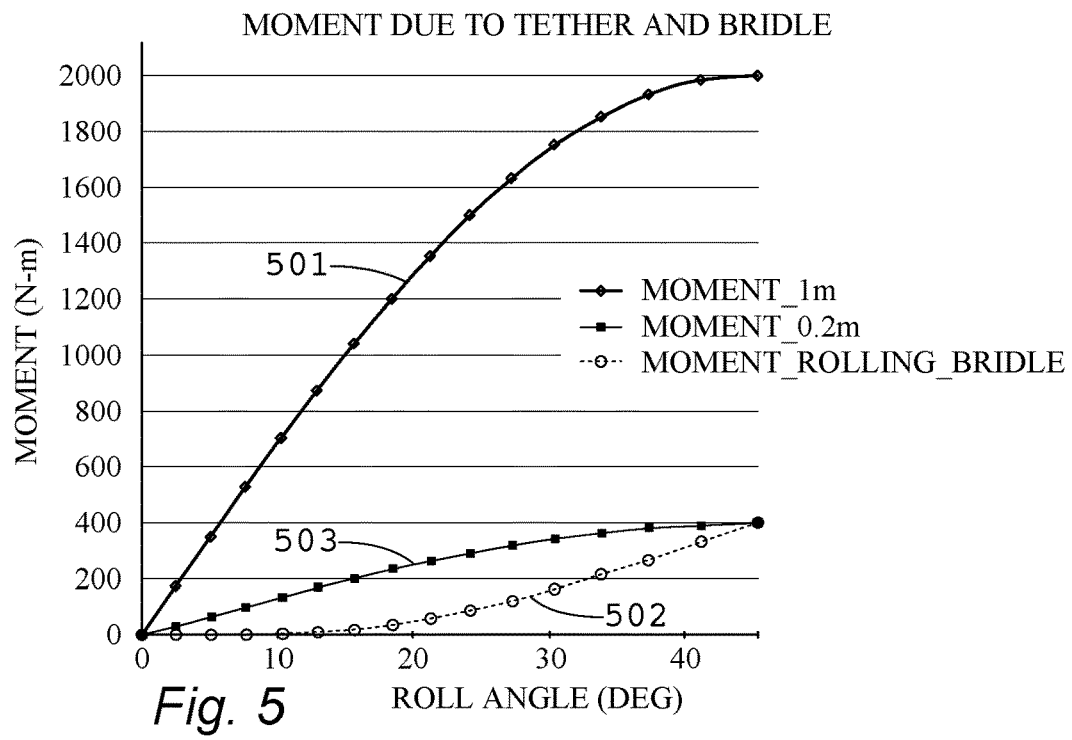
FIG. 5 is a graph of roll moment vs. roll angle for the fixed bridle with a 1 m offset 501, the hybrid rolling bridle 502, and a single attachment point 0.2 m below the wing 503.

FIG. 5 is a graph of roll moment vs. roll angle for the fixed bridle with a 1 m offset 501, the hybrid rolling bridle 502, and a single attachment point 0.2 m below the wing 503. A 45° roll angle for the fixed bridle configuration corresponds to a moment of about 2000 N-m, and a 45° roll angle for the single attachment point and hybrid rolling bridle configurations correspond to about 400 N-m, requiring significantly less external control input.

Figure 6:
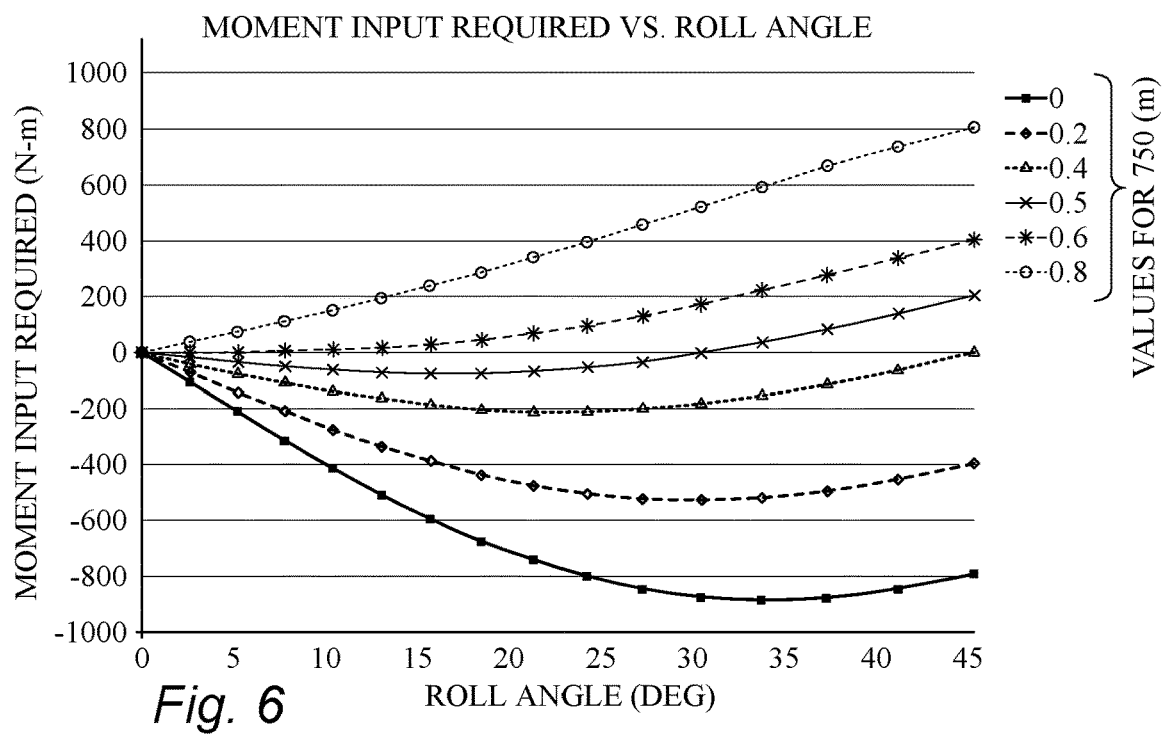
FIG. 6 is a graph of roll moment vs. roll angle for other embodiments of a hybrid rolling bridle which have different vertical distances between the bottom surface of the wing 101 and fixed bridle pivot points 105A & B.

In addition to minimizing roll moments, this bridle system can be designed for other applications. Other embodiments of this bridle may vary the dimensions of the fixed and rolling elements to make the wing stable or unstable at various roll angles. For example, FIG. 6 shows how the bridle stability changes due to changing the vertical distances between the wing and fixed bridle pivot points 105 A,B. (vertical fixed bridle height 750). The bridle can be made unstable at low roll angles but stable at higher positive or negative roll angles (the curves for 0.4 and 0.5), resulting in a wing that easily holds an arbitrary right or left roll angle, but when pushed away from one stable angle, will naturally rotate past the center and reach the other stable angle with no further control input. The bridle can also be unstable for its entire range as shown by the curve for a 0 m distance, which shows the moment vs. roll angle for a pure pulley-based bridle system (i.e. a configuration without fixed bridles offsetting the rolling part of the bridle from the wing. Finally, the bridle can be made stable for its entire range (the curve for a 0.6 m distance).

Therefore, it can be observed that for a wingspan of 7 m (and any given wingspan through the description herein) that the vertical fixed bridle height 750 can be optimized to have the lowest absolute value for moment input during roll from zero to 45 degrees, here the selection would be approximately 0.5 meters for vertical fixed bridle height 750. However, it can also be optimized so that the moment input during roll from zero to 45 degrees would always be greater than zero, here the selection would be approximately 0.6 meters.

FIG. 7 is a graph of the bending moment across a symmetrically loaded wing 101 supported by a fixed bridle 701, a single attachment point 703 and a hybrid rolling bridle 702. The maximum bending moment for the fixed and hybrid rolling bridles is much lower than for a single attachment point, allowing for less rigid and lighter materials to be used. A hybrid bridle can also be designed such that the shear and bending moments are minimized at specific wing locations, such as joints. The fixed and hybrid rolling bridles in FIG. 7 minimize bending moment at about 1.2 m from the center 704, which is where joints 150 would be when separating the wing 101 into three substantially equal-length segments for transport and install. For the embodiment shown here, the overall span of the wing is approximately 7 m, but this can of course be modified for larger/smaller scaled embodiments. This allows removing weight from joining hardware which is likely to be proportionally heavier than other sections of the wing, so that having separable joints 150 will not add significant weight to the overall wing 101. In this way, the wing 101 can be described as being separable at the separation joints 150 into a central wing portion 175 and two surrounding outer wing portions 180.

FIG. 8A is a section view showing a cross-section taken through a plane that is perpendicular to the central axis of a first exemplary embodiment of the tether 102. A large inner electrical conductor 1401 is generally aligned with the central axis of the tether and surrounded by insulation layer 1402. An outer electrical conductor 1403 preferably surrounds the insulation layer 1402, with an outer insulator 1404 surrounding the outer conductor 1403. In some embodiments, a strength member 1405 will preferably surround the outer insulator 1404, and a jacket 1406 may surround the strength member 1405. As shown, each layer is generally coaxial with one another and surrounds each adjacent layer, although not necessarily in contact with each other at all points along the tether.

FIG. 8B is a section view showing a cross-section taken through a plane that is perpendicular to the central axis of a second exemplary embodiment of the tether 102. Here, the various elements of the tether are not co-axial. Here, the electrical conductor 1401 is surrounded by insulation 1402 and runs alongside (with an axis that is generally parallel to) electrical conductor 1403, which is also surrounded by insulation 1404. In this embodiment, a strength member 1405 may also run alongside (with an axis that is generally parallel to) the conductors 1403 and 1401. Each element is then wrapped in a jacket 1406.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A bridle and wing assembly comprising:
 a wing having two opposing ends;
 a fixed bridle member attached to a bottom surface of the wing;

a pair of connection points positioned on the fixed bridle and located at distance D vertically below the bottom surface of the wing;

a rolling bridle member with a pair of opposing ends, where each opposing end is attached at one of the connection points; and a pulley with a sheave that travels along the rolling bridle member.

2. The assembly of claim 1 further comprising:
a motor mechanically connected to the sheave.

3. The assembly of claim 1 further comprising:
a tether attached to the pulley and containing at least one electrical conductor.

4. The assembly of claim 1 wherein:
distance D is selected so that only positive moment inputs are required for the wing to achieve all roll angles between zero and 45 degrees.

5. The assembly of claim 2 wherein:
actuation of the motor causes the wing to roll when the wing is airborne and tethered to a ground connection point.

6. The assembly of claim 3 wherein:
the electrical conductors of the tether continue past the pulley to connect with the wing.

7. The assembly of claim 1 wherein:
the wing contains a pair of separation joints on each side of a centerline of the wing so that a separation joint is placed generally above each connection point.

8. The assembly of claim 1 wherein:
distance D is selected so that the absolute value for all moment inputs required for the wing to achieve all roll angles between zero and 45 degrees has been minimized.

9. The assembly of claim 1 wherein:
the wing contains a pair of separation joints on each side of a centerline to define a central wing portion with two outer wing portions, and wherein the fixed bridle member connects between the central wing portion and the outer wing portion.

10. A bridle and wing assembly comprising:
a wing having two opposing ends and a centerline at the center of the wing;
a pair of fixed bridle members, each pair having a proximal end which is attached to a bottom surface of the wing near the centerline and a distal end which is attached near the opposing ends of the wing;
a connection point located between the proximal and distal ends of each fixed bridle member;
a rolling bridle member with a pair of opposing ends, where each opposing end is attached with a fixed bridle member at the connection point; and a motorized pulley with a sheave that accepts the rolling bridle member such that actuation of the motor causes the wing to change its roll angle.

11. The assembly of claim 10 further comprising:
a tether attached to the pulley.

12. The assembly of claim 10 wherein:
the connection point on each fixed bridle member is positioned near the center of each fixed bridle member.

13. The assembly of claim 11 further comprising:
one or more electrical conductors within the tether.

14. The assembly of claim 11 wherein:
the electrical conductors of the tether continue past the pulley to connect with the wing.

15. A bridle and wing assembly comprising:
a wing comprised of a central wing portion and a pair of surrounding outer wing portions connected to the central wing portion at separation joints;
a pair of fixed bridle members, each pair having a proximal end which is attached to a bottom surface of the central wing portion and a distal end which is attached to one of the outer wing portions;
a connection point located between the proximal and distal ends of each fixed bridle member;
a rolling bridle member with a pair of opposing ends, where each opposing end is attached with a fixed bridle member at the connection point; and
a pulley with a sheave that accepts the rolling bridle member.

16. The assembly of claim 15 wherein:
the connection points are located at a vertical distance below the bottom surface of the wing that allows for only positive moment inputs for all roll angles between zero and 45 degrees.

17. The assembly of claim 15 wherein:
the connection points are located at a vertical distance below the bottom surface of the wing which minimizes the absolute value of moment input required for all roll angles between zero and 45 degrees.

18. The assembly of claim 15 wherein:
the wing separation joints are positioned on areas of the wing having a bending moment that is between −200 N-m and +200 N-m near zero N m.

19. The assembly of claim 15 further comprising:
a motor mechanically connected to the sheave.

20. The assembly of claim 15 further comprising:
a tether attached to the pulley and comprised of one or more electrical conductors which continue past the pulley and attach to the wing.

* * * * *